United States Patent
Takatori

(10) Patent No.: US 9,900,121 B1
(45) Date of Patent: Feb. 20, 2018

(54) APPARATUS, SYSTEM, AND METHOD FOR REDUCING A NUMBER OF INTERSYMBOL INTERFERENCE COMPONENTS TO BE SUPPRESSED

(71) Applicant: Futurewei Technologies, Inc., Plano, TX (US)

(72) Inventor: Hiroshi Takatori, Sacramento, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/260,117

(22) Filed: Sep. 8, 2016

(51) Int. Cl.
*H04L 27/01* (2006.01)
*H04J 11/00* (2006.01)
*H04L 25/03* (2006.01)
*H04L 12/26* (2006.01)

(52) U.S. Cl.
CPC .... *H04J 11/0036* (2013.01); *H04L 25/03057* (2013.01); *H04L 43/16* (2013.01)

(58) Field of Classification Search
CPC . H04L 2025/03617; H04L 2025/03681; H04L 2025/03433; H04L 25/03006; H04L 25/03057; H04L 25/03949; H04L 2201/00; H04L 2025/03592; H04L 2025/03566; H04L 25/03044; H04J 11/0036

See application file for complete search history.

(56) References Cited

U.S. PATENT DOCUMENTS

| | | | | |
|---|---|---|---|---|
| 5,367,540 A | * | 11/1994 | Kakuishi | H03H 17/04 375/232 |
| 5,414,733 A | * | 5/1995 | Turner | H04L 25/03057 375/233 |
| 7,075,363 B1 | | 7/2006 | Than | |
| 7,421,022 B2 | | 9/2008 | Choudhary et al. | |
| 7,426,236 B1 | * | 9/2008 | He | H04L 25/03057 375/232 |
| 8,706,042 B2 | | 4/2014 | Takatori | |

(Continued)

OTHER PUBLICATIONS

Takatori, U.S. Appl. No. 15/260,146, filed Sep. 8, 2016.

(Continued)

*Primary Examiner* — Aristocratis Fotakis
(74) *Attorney, Agent, or Firm* — Zilka-Kotab, PC

(57) ABSTRACT

An apparatus, system, and method are provided for reducing a number of intersymbol interference components to be suppressed. Included is a receiver path with a linear equalizer configured to: receive a signal pulse including a data component and a first number of post-cursor intersymbol interference components, delay and process the signal pulse such that the signal pulse includes a second number of post-cursor intersymbol interference components which is less than the first number of post-cursor intersymbol interference components, and produce an output signal that includes the data component and the second number of post-cursor intersymbol interference components. The receiver path further includes a decision feedback equalizer in electrical communication with the linear equalizer. The decision feedback equalizer is configured to: receive the output signal from the linear equalizer, and suppress the second number of the post-cursor intersymbol interference components of the output signal.

21 Claims, 8 Drawing Sheets

(56) References Cited

U.S. PATENT DOCUMENTS

| | | | |
|---|---|---|---|
| 8,929,429 B2 | 1/2015 | Takatori et al. | |
| 9,065,644 B2 | 6/2015 | Takatori | |
| 9,172,498 B2 | 10/2015 | Takatori et al. | |
| 9,565,037 B1* | 2/2017 | Liu | H04L 25/03057 |
| 2003/0223489 A1* | 12/2003 | Smee | H04L 1/188 |
| | | | 375/233 |
| 2004/0120394 A1 | 6/2004 | Miao et al. | |
| 2006/0203900 A1* | 9/2006 | Koralek | H04L 25/03267 |
| | | | 375/233 |
| 2008/0063042 A1* | 3/2008 | Tsuie | H04L 25/03063 |
| | | | 375/233 |
| 2008/0232453 A1* | 9/2008 | Cohen | H04L 25/03057 |
| | | | 375/232 |
| 2010/0098147 A1* | 4/2010 | Miller | H04L 25/03057 |
| | | | 375/233 |
| 2012/0027074 A1* | 2/2012 | Raghavan | H04L 25/03057 |
| | | | 375/233 |
| 2012/0155530 A1* | 6/2012 | Zhong | H04L 25/03057 |
| | | | 375/233 |
| 2012/0327818 A1 | 12/2012 | Takatori | |
| 2013/0287088 A1* | 10/2013 | Mobin | H04L 7/10 |
| | | | 375/233 |
| 2014/0064351 A1* | 3/2014 | Hidaka | H04L 27/01 |
| | | | 375/232 |
| 2014/0079111 A1* | 3/2014 | Hui | H04L 25/03044 |
| | | | 375/234 |
| 2015/0085914 A1 | 3/2015 | Kizer et al. | |
| 2015/0249532 A1 | 9/2015 | Takatori | |

OTHER PUBLICATIONS

Bulzacchelli et al., "A 28-Gb/s 4-Tap FFE/15-Tap DFE Serial Link Transceiver in 32-nm SOI CMOS Technology," IEEE, vol. 47, No. 12, Dec. 2012, pp. 3232-3248.

Stephens, R., "Optimize equalization for FFE, CTLE, DFE, and crosstalk," EDN Network, Oct. 21, 2015, available at http://www.edn.com/electronics-blogs/eye-on-standards/4440609/Optimize-equalization-for-FFE-CTLE-DFE-and-crosstalk.

Telang, V., "Equalization for High-Speed Serdes: System-level Comprison of Analog and Digital Techniques," Broadcom Corporation, Aug. 2012, pp. 1-67.

Turker et al., "A 19Gb/s 38mW 1-Tap Speculative DFE Receiver in 90nm CMOS," VLSI Circuits, Jun. 2009, pp. 1-26.

Takatori et al., "100G Signaling Options over Backplane Classes," IEEE P802.3bj, Jan. 2012, pp. 1-10.

Mazzini et al., "C2M CDAUI-8: considerations and proposals on P802.3bs 400 Gb/s Ethernet draft," IEEE 802.3bs Task Force, Nov. 2015, pp. 1-17.

Takatori et al., "56G LR Margin over 40 inch CH," Optical Internetworking Forum, Oct. 2014, pp. 1-11.

\* cited by examiner

APPARATUS, SYSTEM, AND METHOD FOR REDUCING A NUMBER OF INTERSYMBOL INTERFERENCE COMPONENTS TO BE SUPPRESSED

FIELD OF THE INVENTION

The present invention relates to communication systems, and more particularly to intersymbol interference suppression.

BACKGROUND

A massive data traffic increase has been witnessed recently in data centers which, in turn, has forced interconnect link-speeds from lower speeds (e.g. 10-28 Gbps, etc.) to significantly higher speeds (e.g. 56 Gbps and up, etc.). Based on such demand, a throughput of interconnects [e.g. serializer/deserializer (SerDes), etc.] has been increased by at least a factor of two, and possibly higher.

This, in turn, has resulted in a variety of technical issues. For example, removing intersymbol interference for each and every signal pulse can contribute considerably to power consumption. Further, this issue is compounded when the speed at which such signal pulses (and thus the intersymbol interference) are received is multiplied by the foregoing factor of two.

SUMMARY

An apparatus, system, and method are provided for reducing a number of intersymbol interference components to be suppressed. Included is a receiver path with a linear equalizer configured to: receive a signal pulse including a data component and a first number of post-cursor intersymbol interference components, delay and process the signal pulse such that the signal pulse includes a second number of post-cursor intersymbol interference components which is less than the first number of post-cursor intersymbol interference components, and produce an output signal that includes the data component and the second number of post-cursor intersymbol interference components. The receiver path further includes a decision feedback equalizer in electrical communication with the linear equalizer. The decision feedback equalizer is configured to: receive the output signal from the linear equalizer, and suppress the second number of the post-cursor intersymbol interference components of the output signal.

In a first embodiment, the receiver path may be a component of a serializer/deserializer. Further, the output signal may be delayed and processed by the linear equalizer.

In a second embodiment (which may or may not be combined with the first embodiment), the linear equalizer may include a feed forward equalizer.

In a third embodiment (which may or may not be combined with the first and/or second embodiments), further included may be at least one comparator, and at least one latch in electrical communication with the decision feedback equalizer and the linear equalizer. The at least one comparator and the at least one latch may cooperate for latching the output signal to generate a latched signal that is received by the decision feedback equalizer. As a further option, a decoder may be provided in electrical communication between the decision feedback equalizer, and the at least one comparator and at least one latch.

In a fourth embodiment (which may or may not be combined with the first, second, and/or third embodiments), the apparatus may be configured such that the delay and the processing of the signal pulse reduces an effect of a first post-cursor intersymbol interference component such that, at a time when the first post-cursor intersymbol interference component would otherwise occur, the output signal of the linear equalizer is zero (0), or at least below a predetermined threshold.

In a fifth embodiment (which may or may not be combined with the first, second, third, and/or fourth embodiments), the apparatus may be configured such that an initial post-cursor intersymbol interference component requiring suppression includes that which would have been, in an absence of the delay and the processing, a second post-cursor intersymbol interference component.

In a sixth embodiment (which may or may not be combined with the first, second, third, fourth, and/or fifth embodiments), at least a portion of the decision feedback equalizer may be configured for operating at a rate that is a fraction of an operational speed of the apparatus/system such that one or more downstream components has sufficient time to operate.

In a seventh embodiment (which may or may not be combined with the first, second, third, fourth, fifth, and/or sixth embodiments), the decision feedback equalizer may include a plurality of decision feedback equalizer components that operate using different clocks. As an option, the decision feedback equalizer components may each include a plurality of delay circuits and different tap points among the delay circuits each for suppressing different post-cursor intersymbol interference components.

In an eighth embodiment (which may or may not be combined with the first, second, third, fourth, fifth, sixth, and/or seventh embodiments), an interference suppression may be augmented in connection with a second post-cursor intersymbol interference component.

To this end, in some optional embodiments, one or more of the foregoing features of the aforementioned apparatus, system and/or method may avoid the need for suppression of one (e.g. the first) of a finite number of post-cursor intersymbol interference components that occur in connection with every signal pulse. Thus, in an exemplary case where there are five (5) post-cursor intersymbol interference components, there is an opportunity to avoid twenty percent (20%) of post-cursor intersymbol interference suppression. This may, in turn, result in significant power savings and other benefits that would otherwise be foregone in systems that lack such capabilities. It should be noted that the aforementioned potential advantages are set forth for illustrative purposes only and should not be construed as limiting in any manner.

DETAILED DESCRIPTION

Figure 1A:
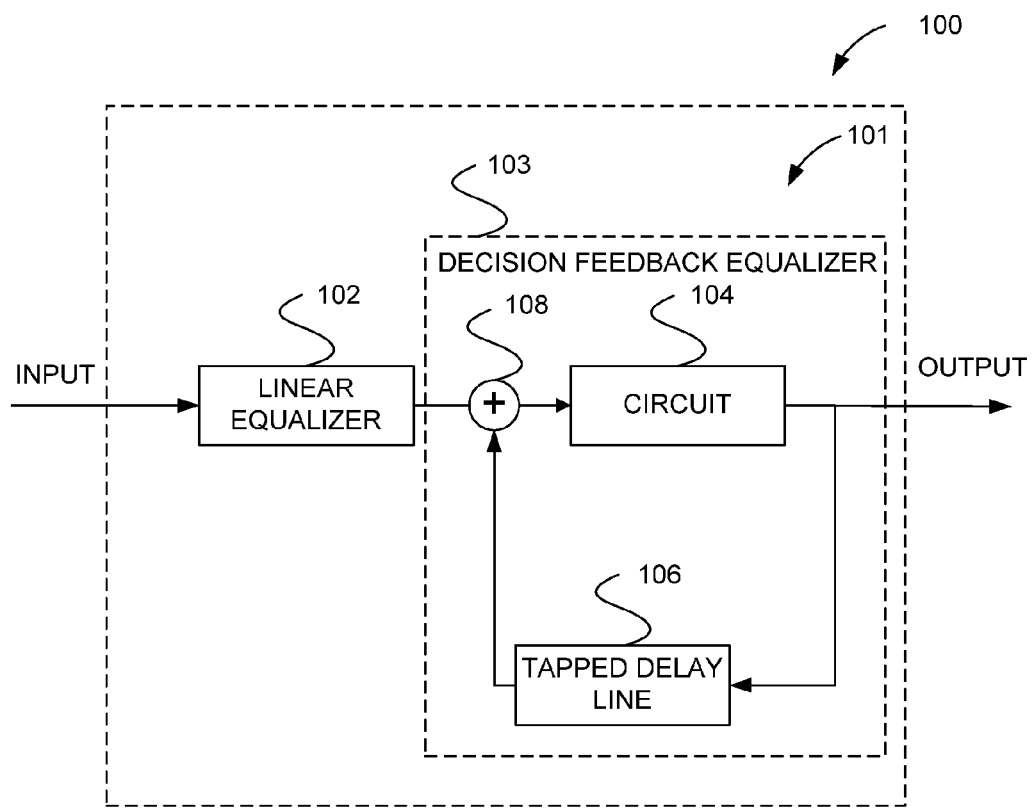
FIG. 1A illustrates an apparatus including a receiver path for reducing a number of post-cursor intersymbol interference components to be suppressed, in accordance with one embodiment.

FIG. 1A illustrates an apparatus 100 including a receiver path 101 for reducing a number of post-cursor intersymbol interference components to be suppressed, in accordance with one embodiment. As shown, the receiver path 101 includes a linear equalizer 102 in electrical communication with a decision feedback equalizer (DFE) 103. The DFE 103, in turn, includes an adder 108 that is in electrical communication with a circuit 104. An output of the circuit 104 is fed back (and is thus in electrical communication with) the adder 108 in the manner shown via a tapped delay line 106. More information will now be set forth regarding the configuration, functionality, and cooperation of the various components of the apparatus 100, for reducing a number of post-cursor intersymbol interference components to be suppressed.

In the context of the present description, the receiver path 101 may refer to any combination of circuits, components, elements, etc. that are configured for receiving signals. For example, strictly as an option, the receiver path 101 may be a component of a serializer/deserializer (SerDes), which may refer to any apparatus that includes at least two components, one for converting data from a serial form to a parallel form, and another one for converting data from a parallel form to a serial form. In one embodiment, the aforementioned SerDes may be implemented in the context of a full-duplex communication system. With that said, other embodiments are contemplated where the apparatus 100 may take the form of other high speed link designs.

Also in the context of the present description, post-cursor intersymbol interference components (or "post-cursor intersymbol interference"), may refer to any distortion (e.g. alteration, etc.) of a signal that is caused by another previous signal. For example, in one embodiment, the post-cursor intersymbol interference may include interference that affects a particular symbol and is caused by another symbol (e.g. that temporally precedes the particular symbol). Further, the reduction of the number of post-cursor intersymbol interference components to be suppressed may result in an omission of, or diminishment in, any act whose purpose is to at least reduce (or even completely remove) at least one post-cursor intersymbol interference component (e.g. a first post-cursor intersymbol interference component, etc.).

To accomplish this, the apparatus 100 includes the linear equalizer 102 that receives input signals with signal pulses. In the present description, such signal pulses may refer to any increase in magnitude (either positive or negative) in connection with the input signals. Further, the linear equalizer 102 may refer to any circuit that processes the input signals with a linear or substantially linear filter. In one possible embodiment that will be subsequently described, the linear equalizer 102 may include a feed forward equalizer (FFE).

With continuing reference to FIG. 1A, the linear equalizer 102 is shown to be in electrical communication with the circuit 104 which, in turn, is configured to process the output signals of the linear equalizer 102, prior to being fed back via the tapped delay line 106 of the DFE 103 that is in electrical communication with the foregoing components. In the context of the present description, "electrical communication" may refer to any direct (i.e. no component(s) therebetween, etc.) and/or indirect electrical communication where one or more components are connected therebetween for processing or otherwise affecting a signal transmitted therebetween. Further, it should be noted that, in the context of the present description, the DFE 103 may refer to any filter that utilizes a feedback of signals (e.g. in the form of symbols and/or some derivation thereof, etc.) for improving a signal output.

Further, the tapped delay line 106 may include a tap at any point within the DFE 103 that results in a certain delay of the aforementioned feedback. For example, in an embodiment where the DFE includes a plurality of serially-coupled delay circuits such as flip flops (and each flip flop causes a portion of an overall delay), a specific tap point among such flip flops may result in a particular delay being incorporated into the feedback. More information regarding possible tap points will be set forth later in greater detail during reference to other embodiments described in the context of one or more subsequent figures.

In one embodiment, the aforementioned circuit 104 may be configured to process the input signals to sample, hold, decode, and/or conduct any other operation that prepares the input signals prior to feeding the same back via the tapped delay line 106. In one possible embodiment that will be elaborated upon later, the circuit 104 may include a comparator, a latch, and a decoder.

As shown, the DFE 103 further includes the adder 108 that remains in electrical communication with each of the foregoing components. In operation, the adder 108 serves to add a signal at the tapped delay line 106 to an output signal of the linear equalizer 102, for cancelling post-cursor intersymbol interference. In other embodiments, other components (e.g. a subtractor, etc.) may be utilized in lieu of the adder 108.

By this design, the linear equalizer 102 is configured to cooperate with the DFE 103 and, in response to a signal pulse, delay an output signal of the linear equalizer 102 so as to reduce an effect of the first post-cursor intersymbol interference in connection with the output signal. In the context of the present description, such delay may result in any time-shifting of one or more aspects (e.g. positive or negative peaks, any other characteristic, etc.) of the signal pulse. It should be noted that, in various embodiments, a delayed version of the signal pulse may not necessarily be identical in every other aspect, other than timing. For example, other processing (e.g. filtering, etc.) may be carried out by the linear equalizer 102.

In one embodiment, the delay of the signal pulse may avoid the need to suppress the first post-cursor intersymbol interference, by delaying an output of the linear equalizer 102 such that, at a time when the first post-cursor intersymbol interference would otherwise occur, the output signal of the linear equalizer 102 is zero (0), or at least below a predetermined threshold (e.g. 5%, 10%, 15%, etc. of a signal pulse magnitude, etc.). Thus, an initial post-cursor intersymbol interference that requires suppression (e.g. the first one to be received, etc.) may include that which would have been, in an absence of the delay, a second post-cursor intersymbol interference. In some embodiments, the apparatus 100 may thus be configured for suppressing such second post-cursor intersymbol interference (and any subsequent post-cursor intersymbol interference) in connection with the signal pulse. For example, this may be accomplished by a signal at the tapped delay line 106 (e.g. a correction signal, etc.) being applied to the output signal of the linear equalizer 102 at a time that coincides with such second post-cursor intersymbol interference, for suppressing the second post-cursor intersymbol interference.

To this end, in some optional embodiments, one or more of the foregoing features may avoid the need for suppressing one (e.g. the first) of a finite number of post-cursor intersymbol interference components that occur after a data component (e.g. peak, main cursor, decision phase, etc.) of every signal pulse. Thus, in an exemplary case where there are five (5) post-cursor intersymbol interference components, there is an opportunity to avoid twenty percent (20%) of post-cursor intersymbol interference suppression. This may, in turn, result in significant power savings that would otherwise be foregone in systems that lack such capabilities. Further, the use of the linear equalizer 102 (and particularly a FFE) may require less die area, thereby affording additional cost savings (as compared to other alternate components, etc.). Still yet, the linear equalizer 102 (and particularly a FFE) may not necessarily suffer from clock noise (since no clock is necessary for an FFE, in some optional embodiments). It should be noted that the aforementioned potential advantages are set forth for illustrative purposes only and should not be construed as limiting in any manner.

More illustrative information will now be set forth regarding various optional architectures and uses in which the foregoing method may or may not be implemented, per the desires of the user. For example, in one specific embodiment (to be described in the context of FIG. 4) the DFE may include a plurality of DFE components that operate using different clocks. Further, the DFE components may each include a plurality of delay circuits and different tap points among the delay circuits each for suppressing different post-cursor intersymbol interference. Any of the following features may be optionally incorporated with or without the exclusion of other features described.

Figure 1B:
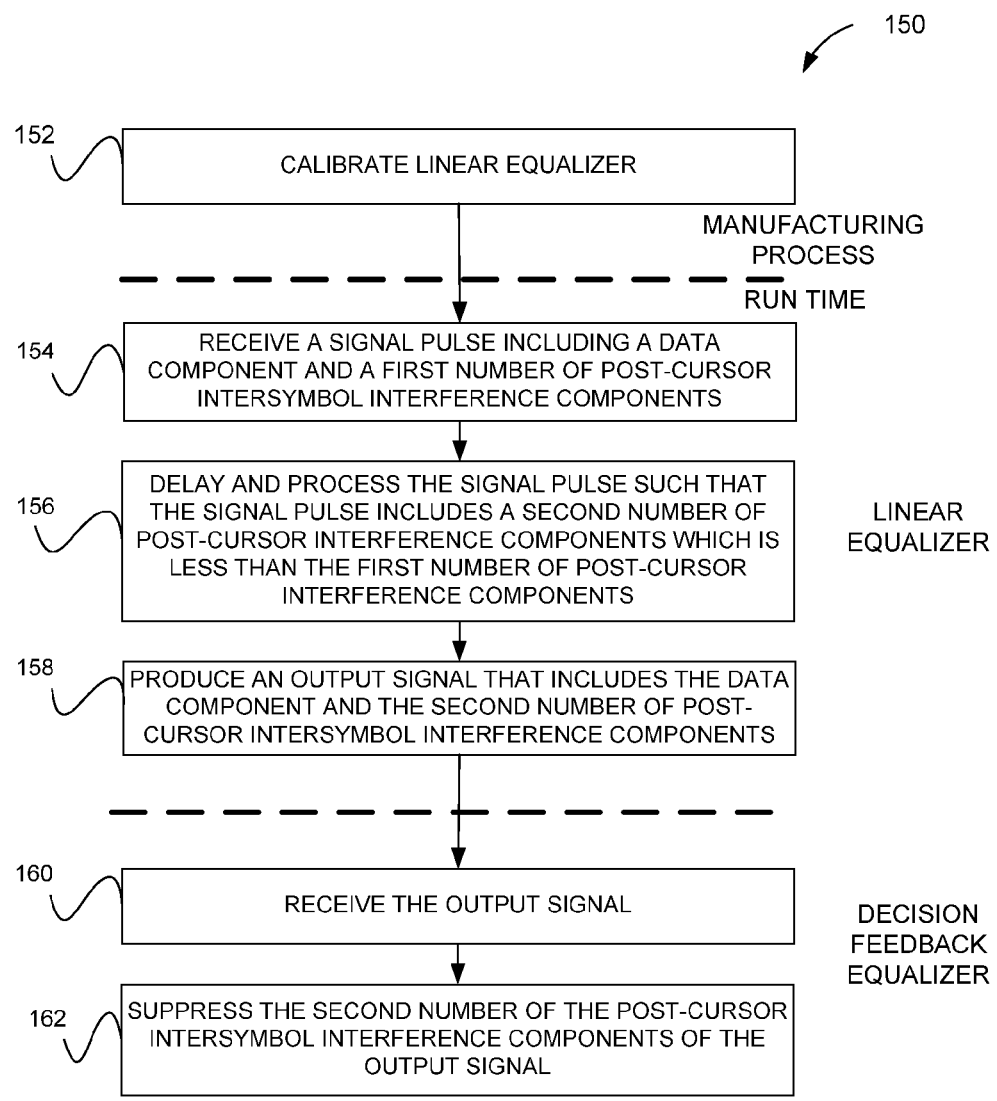
FIG. 1B illustrates a method for reducing a number of post-cursor intersymbol interference components to be suppressed, in accordance with one embodiment.

FIG. 1B illustrates a method 150 for reducing a number of post-cursor intersymbol interference components to be suppressed, in accordance with one embodiment. As an option, the method 150 may be implemented in the context of any one or more of the embodiments set forth in any previous and/or subsequent figure(s) and/or description thereof. For example, the method 150 may represent operation of the apparatus 100 of FIG. 1A. However, it is to be appreciated that the method 150 may be implemented in the context of any desired environment.

As shown, during a manufacturing process (before an apparatus is shipped), a linear equalizer may be calibrated in operation 152. During such calibration, a delay of one or more delay circuits of the linear equalizer may be set so that a first post-cursor intersymbol interference is properly time-shifted so as to reduce an effect thereof. For example, in one embodiment, a probe signal may be emitted and a delay may be measured to determine whether such delay is properly timed so as to reduce the effect of the first post-cursor intersymbol interference. Similarly, one or more coefficients may be set based on a magnitude of such first post-cursor intersymbol interference. This may, for example, be accomplished by measuring the first post-cursor intersymbol interference, and iterating through the aforementioned probe signal/delay measurement process until a proper time-shifting/coefficient setting is accomplished. More information regarding various delay circuit components by which the foregoing calibration may occur, will be set forth during the description of FIG. 2B.

During runtime (after the apparatus is shipped), operations 154-158 proceed by utilizing a linear equalizer (e.g. the linear equalizer 102 of FIG. 1A, etc.), as shown. Specifically, a signal pulse is received in operation 154 that includes a data component (e.g. a main cursor, etc.) and a first number of post-cursor intersymbol interference components. Thereafter, the signal pulse is delayed and processed in operation 156 such that the signal pulse includes a second number of post-cursor intersymbol interference components which is less than the first number of post-cursor intersymbol interference components. In particular, a first post-cursor intersymbol interference may be timed or time-shifted to be zero, near zero, below a threshold, etc., so that there is no need to suppress the same. In other words, the second number may include the first number minus one (1). To this end, an initial post-cursor intersymbol interference requiring suppression may include that which would have been, in an absence of the delay, a second post-cursor intersymbol interference, followed by subsequent post-cursor intersymbol interference, if any. Other embodiments are contemplated where additional post-cursor intersymbol interference may be removed, as well. In any case, per operation 158, an output signal is produced that includes the data component and the second number of post-cursor intersymbol interference components (e.g. without the first post-cursor intersymbol interference).

With continuing reference to FIG. 1B, operations 160-162 proceed by utilizing a DFE (e.g. the DFE 103 of FIG. 1A, etc.), as shown. Specifically, in operation 160, the output signal of the linear equalizer is received by the DFE. Further, in operation 162, the DFE suppresses the second number of the post-cursor intersymbol interference components of the output signal (without the need to suppress the first post-cursor intersymbol interference).

Figure 3:
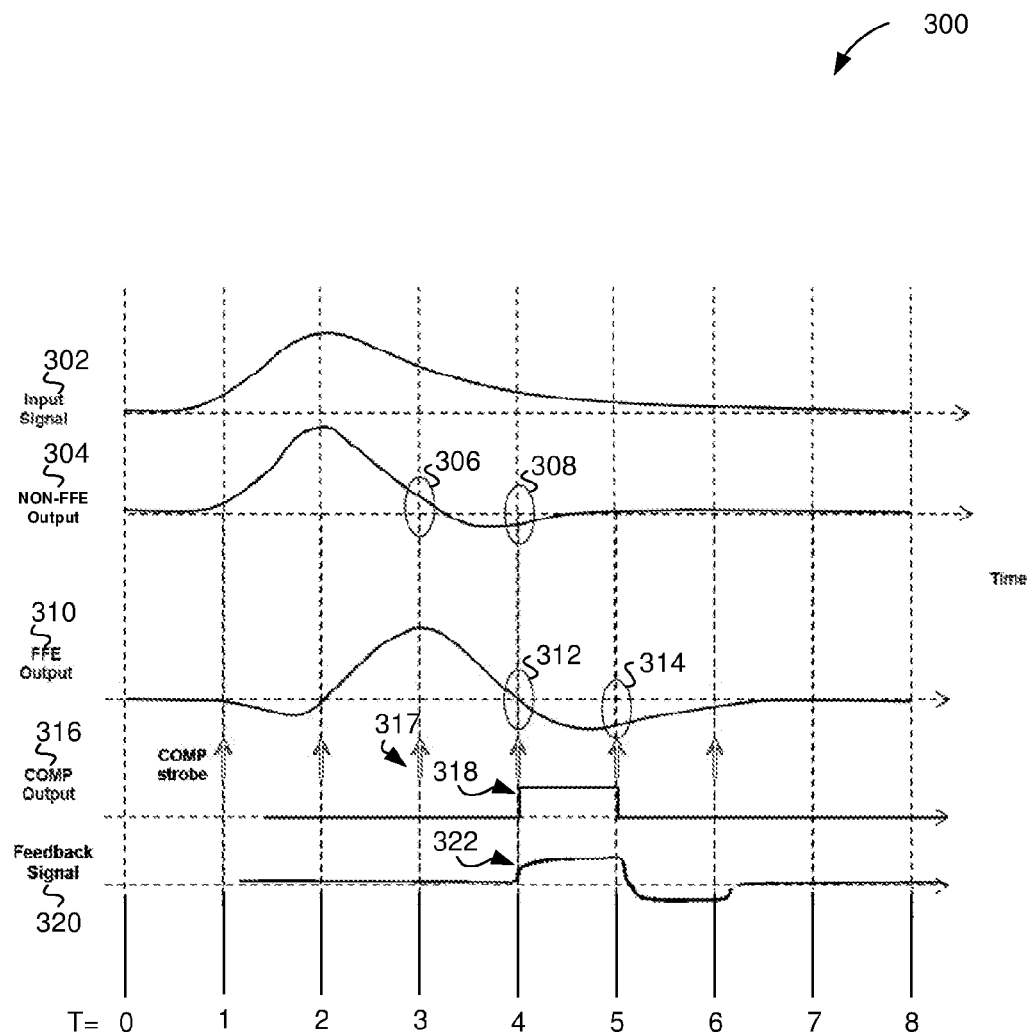
FIG. 3 illustrates a plot showing one possible way a delay results in an avoidance of a need to suppress the first post-cursor intersymbol interference in connection with each signal pulse, in accordance with one embodiment.

As will become more apparent during the description of FIG. 3, a magnitude of the second post-cursor intersymbol interference may be augmented as a result of the delay of operation 156. Thus, any interference suppression initiated in connection with such second post-cursor intersymbol interference in operation 162 may be augmented to compensate for the same. In one possible embodiment, a magnitude of a correction signal may be augmented to accomplish this.

Figure 2A:
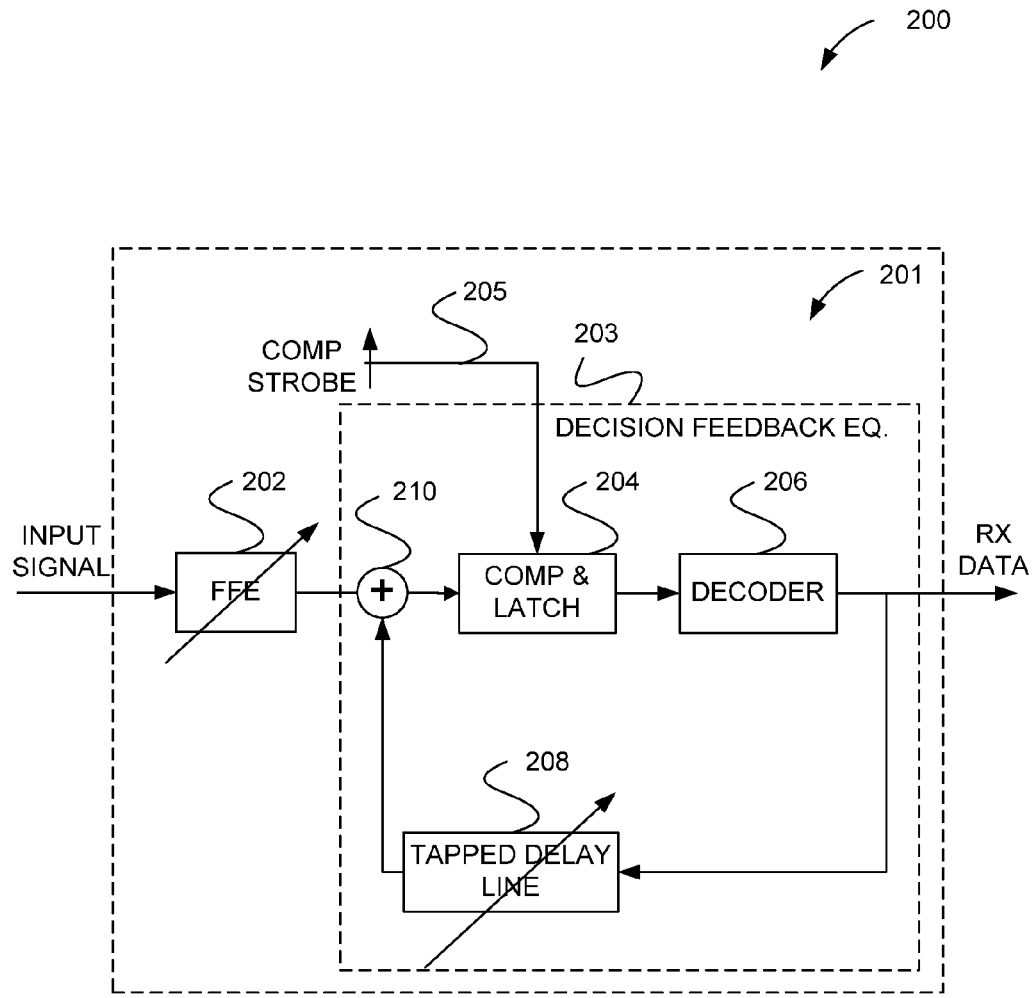
FIG. 2A illustrates an apparatus including a receiver path for reducing a number of post-cursor intersymbol interference components to be suppressed, in accordance with another embodiment.

FIG. 2A illustrates an apparatus 200 including a receiver path 201 for reducing a number of post-cursor intersymbol interference components to be suppressed, in accordance with another embodiment. As an option, the apparatus 200 may be implemented in the context of any one or more of the embodiments set forth in any previous and/or subsequent figure(s) and/or description thereof. However, it is to be appreciated that the apparatus 200 may be implemented in the context of any desired environment.

As shown, the receiver path 201 includes an FFE 202 in electrical communication with a DFE 203. The DFE 203, in turn, includes an adder 210 that is in electrical communication with a comparator/latch component 204 in serial electrical communication with a decoder 206. In various embodiments, the comparator/latch component 204 may be equipped with multiple comparators and/or latches. For example, in a pulse amplitude modulation-4 (PAM4) environment with full-duplex capabilities, the comparator/latch component 204 may include three (3) comparators. An output of the decoder 206 is fed back (and is thus in electrical communication with) the adder 210 in the manner shown via a tapped delay line 208. More information regarding possible tap points will be set forth later in greater detail during reference to other embodiments described in the context of one or more subsequent figures.

In use, the FFE 202 receives input signals with signal pulses for processing (e.g. filtering, etc.) the same. As will soon become apparent, the FFE 202 delays such signal pulses. Further, such delay may be variable in nature. Also during use, the comparator/latch component 204 serves to sample and hold a level of a particular signal pulse in response to a strobe signal 205, for being decoded by the decoder 206 prior to such latched signal being received at the adder 210 via the tapped delay line 208.

Further, the FFE 202 is configured to cooperate with the DFE 203 and, in response to a signal pulse, delay and process the signal pulse so as to avoid the need to suppress the first post-cursor intersymbol interference after each signal pulse. More information will now be set forth regarding one possible design for the FFE 202.

Figure 2B:
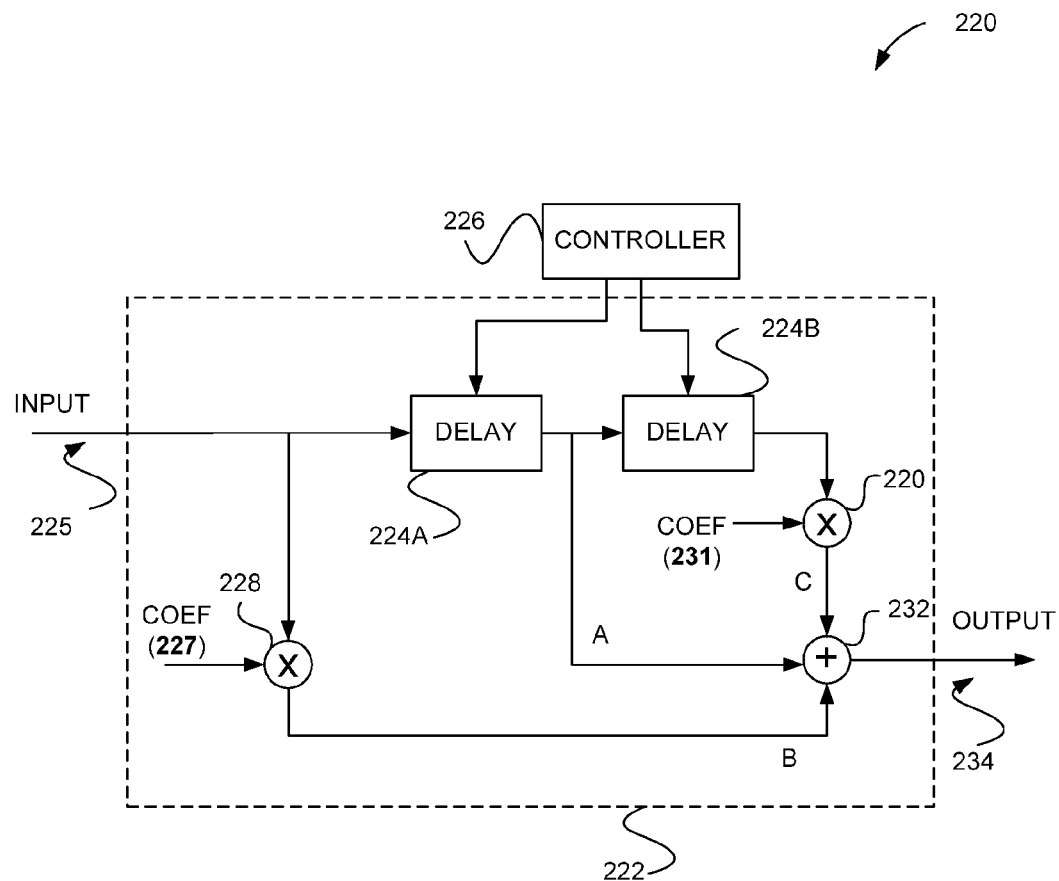
FIG. 2B illustrates a feed forward equalizer (FFE), in accordance with one embodiment.

FIG. 2B illustrates a FFE 220, in accordance with one embodiment. As an option, the FFE 220 may be implemented in the context of any one or more of the embodiments set forth in any previous and/or subsequent figure(s) and/or description thereof. For example, the FFE 220 may be implemented in the context of the FFE 202 of FIG. 2A, or the linear equalizer 102 of FIG. 1A. However, it is to be appreciated that the FFE 220 may be implemented in the context of any desired environment.

As shown, the FFE 220 includes a delay circuit 222 with a plurality of delay components 224A, 224B that are arranged in electrical communication in a serial configuration, in the manner shown. In operation, an input 225 of the delay circuit 222 may be adapted to receive an input signal (e.g. probe signal, runtime signal, etc.). As further shown, a network of multipliers 228, 230 are in electrical communication with the input 225 and an output of one of the delay components 224B so as to control a magnitude thereof (by setting corresponding coefficients 227, 231 during calibration), before generating the ultimate output 234 of the delay circuit 222 via an adder 232 that is ultimately fed to downstream components such as a DFE (e.g. the DFE 103 of FIG. 1A, the DFE 203 of FIG. 2A).

During calibration (e.g. operation 152 of FIG. 1B), a first one of the coefficients 227 and a second one of the coefficients 231 may be set as a function of expected signaling characteristics (e.g. magnitudes, etc.) of a particular communication protocol (e.g. PAM3/PAM4, etc.) as well as any pre-cursor intersymbol interference components and any post-cursor intersymbol interference components. For example, during the calibration process, a probe signal (that is modeled after a particular protocol (e.g. PAM4)) may be input with any pre-cursor and post-cursor intersymbol interference components.

After the probe signal is input, a data component (e.g. a main cursor, data signal) may be measured to have an amplitude of 100 mV, for example, while a first pre-cursor intersymbol interference may be measured to have an amplitude of 20 mV and a first post-cursor intersymbol interference may be measured to have an amplitude of 50 mV. In such case, the first coefficient 227 may be set to −0.2 (i.e. −20 m/100 mV) and the second coefficient 231 may be set to −0.5 (i.e. −50 m/100 mV). Still yet, a configurable delay of a first one of the delay components 224A may be timed to coincide with a first pre-cursor intersymbol interference (if any), and a configurable delay of a second one of the delay components 224B may be timed to coincide with a first post-cursor intersymbol interference.

In another possible embodiment, the delay of one or more of the delay components 224A, 224B may be set using a technique disclosed in an application filed coincidently herewith under Ser. No. 15/260,146 and entitled "APPARATUS AND METHOD FOR CONTROLLING A DELAY CIRCUIT," which is incorporated herein by reference in its entirety for all purposes. By these settings of the delay components 224A, 224B and coefficients 227, 231, a delayed version of the input signal is output via path A in FIG. 2B, the first pre-cursor intersymbol interference (if any) may be removed via path B, and the first post-cursor intersymbol interference may be removed via path C, during runtime operation.

As further shown, the delay components 224A, 224B of the delay circuit 222 are further in electrical communication with a controller 226. Such controller 226 may include any circuit that, during calibration, is capable of repeatedly measuring any aspect (e.g. negative/positive peaks, etc.) of an output of the delay components 224A, 224B, and further controlling a length of delay exhibited by the delay components 224A, 224B as well as controlling the coefficients 227, 231. Further, during runtime, the controller 226 may serve to delay the input signal while removing first instances of intersymbol interference. More information will now be set forth regarding one possible way such delay and processing results in the avoidance of a need to suppress the first post-cursor intersymbol interference in connection with a signal pulse.

FIG. 3 illustrates a plot 300 showing one possible way a delay results in an avoidance of a need to suppress a first post-cursor intersymbol interference in connection with each signal pulse, in accordance with one embodiment. As an option, the plot 300 may reflect operation of any one or more of the embodiments set forth in any previous and/or subsequent figure(s) and/or description thereof. However, it is to be appreciated that the plot 300 may reflect operation of any desired environment.

As shown, an input pulse 302 is illustrated that is received by a receive path (e.g. the linear equalizer 102 of FIG. 1A, FFE 202 of FIG. 2A, etc.). For contrast purposes, a non-FFE output signal 304 is shown, where such non-FFE output signal 304 reflects an output of a component that is not one that exhibits sufficient/variable delay to avoid the need to suppress a first post-cursor intersymbol interference. Specifically, as shown, such non-FFE output signal 304 includes a positive non-zero first post-cursor intersymbol interference 306, in addition to a negative non-zero second post-cursor intersymbol interference 308. In use, the receiver path would trigger a suppression mechanism both at time T=3 (to suppress the positive non-zero first post-cursor intersymbol interference 306), as well as at time T=4 (to suppress the negative non-zero second post-cursor intersymbol interference 308).

In contrast to the non-FFE output signal 304, a FFE output signal 310 is shown to be delayed (e.g. time shifted, etc.) as it is outputted from an associated receiver path component (e.g. the linear equalizer 102 of FIG. 1A, FFE 202 of FIG. 2A, etc.). As shown, the FFE output signal 310 is shifted such that, at a point 312 (T=4) where a post-cursor intersymbol interference suppression mechanism would otherwise be triggered to suppress a first post-cursor intersymbol interference, the first post-cursor intersymbol interference is zero (0), or at least below a predetermined threshold. Strictly as an option, any pre-cursor intersymbol interference may be removed in a similar manner at T=2, as well.

To this end, a signal 316 (e.g. a signal that is output from the circuit 104 of FIG. 1A or the comparator/latch 204 of FIG. 2A, etc.) is initiated immediately after the point 312 (T=4), so as to begin the application of a correction feedback signal 320 to the FFE output signal 310, in time to suppress what would have otherwise been the second post-cursor intersymbol interference 314. Thus, there is no need for triggering the post-cursor intersymbol interference suppression mechanism in connection with an initial first post-cursor intersymbol interference (e.g. the positive non-zero first post-cursor intersymbol interference 306, etc.). This may lead to significant power savings, particularly at high data rates.

It should be noted that, while the time shifting of the FFE output signal 310 may render the first post-cursor intersymbol interference null, a magnitude of the second post-cursor intersymbol interference 314 may be augmented. See, for example, a magnitude of the second post-cursor intersymbol interference 308 of the non-FFE output signal 304 versus a magnitude of the second post-cursor intersymbol interference 314 of the FFE output signal 310, in FIG. 3. To compensate for this, a DFE (e.g. the DFE 103 of FIG. 1A, the DFE 203 of FIG. 2A, etc.) may be adapted for augmenting the correction feedback signal 320 accordingly.

With continuing reference to FIG. 3, the signal 316 is prompted by a repetitive strobe signal 317 (e.g. strobe signal 205 of FIG. 2A). A comparator/latch (e.g. the comparator/latch 204 of FIG. 2A, etc.) is placed into an active state when the strobe signal 317 is received by the comparator/latch. At such point, the comparator/latch starts evaluating an input signal (e.g. received from the linear equalizer 102 of FIG. 1A, FFE 202 of FIG. 2A, etc.).

It should be noted that it takes some amount of time for the comparator/latch to make a correct decision where such amount of time depends on a size (e.g. voltage level, etc.) of the input signal that the comparator/latch has to distinguish. For example, 50 ps is a possible time for a normal input signal given modern integrated circuit (IC) technology. In such circumstance, this means that the fastest operation speed of the comparator/latch is 20 GHz operation. However, since any subsequent componentry (e.g. the decoder 206, etc.) requires extra time (say, for example, ~20 ps) for it to perform its operation(s), a final operational speed may be slower than the aforementioned 20 GHz. Thus, in various embodiments, at least a portion of the DFE may be configured for operating at a rate that is a fraction of an operational speed of the system/apparatus such that one or more downstream components has sufficient time to operate. For example, in one specific embodiment, the comparator/latch, decoder, and DFE componentry may, in one embodiment, be configure to operate at a half-to-quarter rate when the operational speed is to be higher than 20-25 GHz.

During use of such embodiment, the signal 316 may be generated by a flip flop clocked with the strobe signal 317 following the decoder. In an embodiment where the DFE is implemented by the aforementioned half rate circuit structure (to deliver a higher speed), the signal 316 may be generated using a sum-one algorithm with or without the decoder. Further, in the present half rate DFE embodiment, additional signals may be used to address any interference after the second post-cursor intersymbol interference 314. More information regarding one possible configuration for such a half rate structure will now be set forth.

Figure 4:
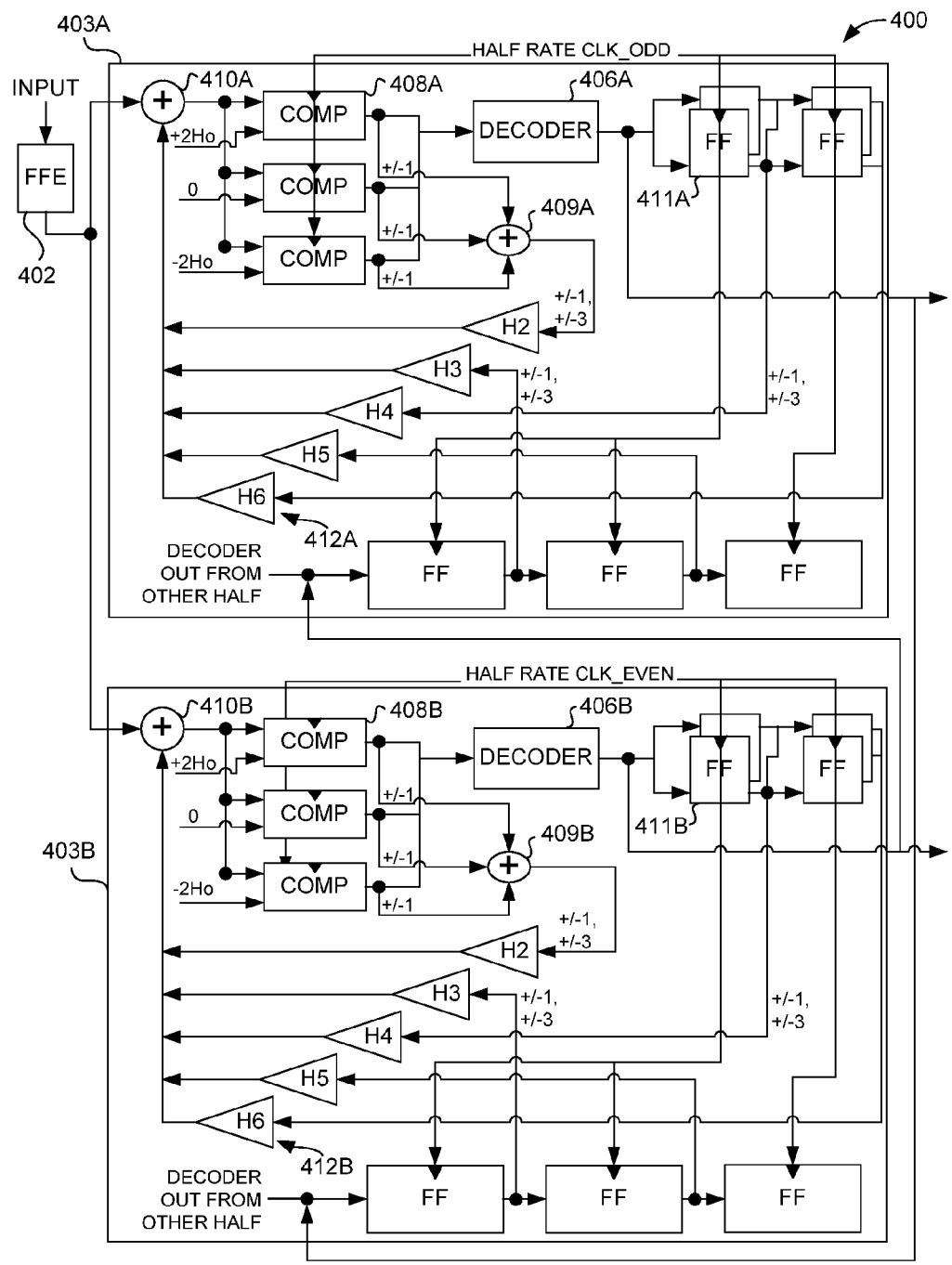
FIG. 4 illustrates another apparatus for implementing a half rate circuit structure, in accordance with one embodiment.

FIG. 4 illustrates another apparatus 400 for implementing a half rate circuit structure, in accordance with one embodiment. As an option, the apparatus 400 may be implemented in the context of any one or more of the embodiments set forth in any previous and/or subsequent figure(s) and/or description thereof. However, it is to be appreciated that the apparatus 400 may be implemented in the context of any desired environment.

As shown, the apparatus 400 includes an FFE 402 in electrical communication with a pair of DFE components 403A, 403B (e.g. an odd and even DFE component, etc.). Each DFE component 403A, 403B, in turn, includes first adders 410A, 410B that are in electrical communication with respective arrays of comparators 408A, 408B that feed both respective second adders 409A, 409B and respective decoders 406A, 406B. An output of each of the second adders 409A, 409B and the decoders 406A, 406B is fed back to the respective first adders 410A, 410B via respective amplifier arrays 412A, 412B and respective flip flop arrays 411A, 411B, in the manner shown.

As will soon become apparent, the amplifier arrays 412A, 412B are each configured to amplify a corresponding correction signal for each of a plurality of post-cursor intersymbol interference components (e.g. second ISI, third ISI, fourth ISI, etc.). In use, such amplification is set to accommodate the manner in which such post-cursor intersymbol interference components dissipate. Specifically, the amplifier arrays 412A, 412B that correct earlier post-cursor intersymbol interference components amplify the corresponding correction signal with a higher magnitude (so as to compensate for larger interference). Conversely, the amplifier arrays 412A, 412B that correct later post-cursor intersymbol interference components amplify the corresponding correction signal with a lower magnitude (so as to compensate for lesser, dissipated interference).

Still yet, to ensure an appropriate corresponding timing of such correction signals (so as to coincide with the different post-cursor intersymbol interference components), the amplifier arrays 412A, 412B receive signals from different tap points among the flip flop arrays 411A, 411B. Specifically, the amplifier arrays 412A, 412B that correct earlier post-cursor intersymbol interference components use, as input, tap points earlier among the chain of flip flop arrays 411A, 411B (so as to incorporate less delay). Conversely, the amplifier arrays 412A, 412B that correct later post-cursor intersymbol interference components use, as input, tap points later among the chain of flip flop arrays 411A, 411B (so as to incorporate more delay). Further, at least a portion of the flip flop arrays 411A, 411B of one of the DFE components 403A, 403B may receive, as input, feedback from an output of another one of the DFE components 403A, 403B, so that the two DFE components 403A, 403B remain synchronized.

In use, the comparators 408A, 408B receive an input pulse signal via the corresponding first adders 410A, 410B and then discerns which of three (3) known pulses (per an appropriate communication protocol) the input pulse signal constitutes. This is accomplished by comparing the input pulse signal with three different reference values (e.g. +/−2 Ho, zero, etc.), such that the appropriate one of the comparators 408A, 408B outputs a latched signal (e.g. with a value of one) that, when added by the second adders 409A, 409B, reflects a correct one of the known pulses. Thus, a sum-one algorithm is implemented.

Further, for the initial post-cursor intersymbol interference pulse that requires suppression (after the first one, which is avoided), the decoders 406A, 406B are bypassed, in the manner shown, for ensuring that minimal delay is incorporated into the corresponding correction signal before being used for post-cursor intersymbol interference suppression. Again, the foregoing circuit structure is set forth illustrative purposes and should not be construed as limiting in any manner, as other circuit structures are contemplated.

Figure 5:
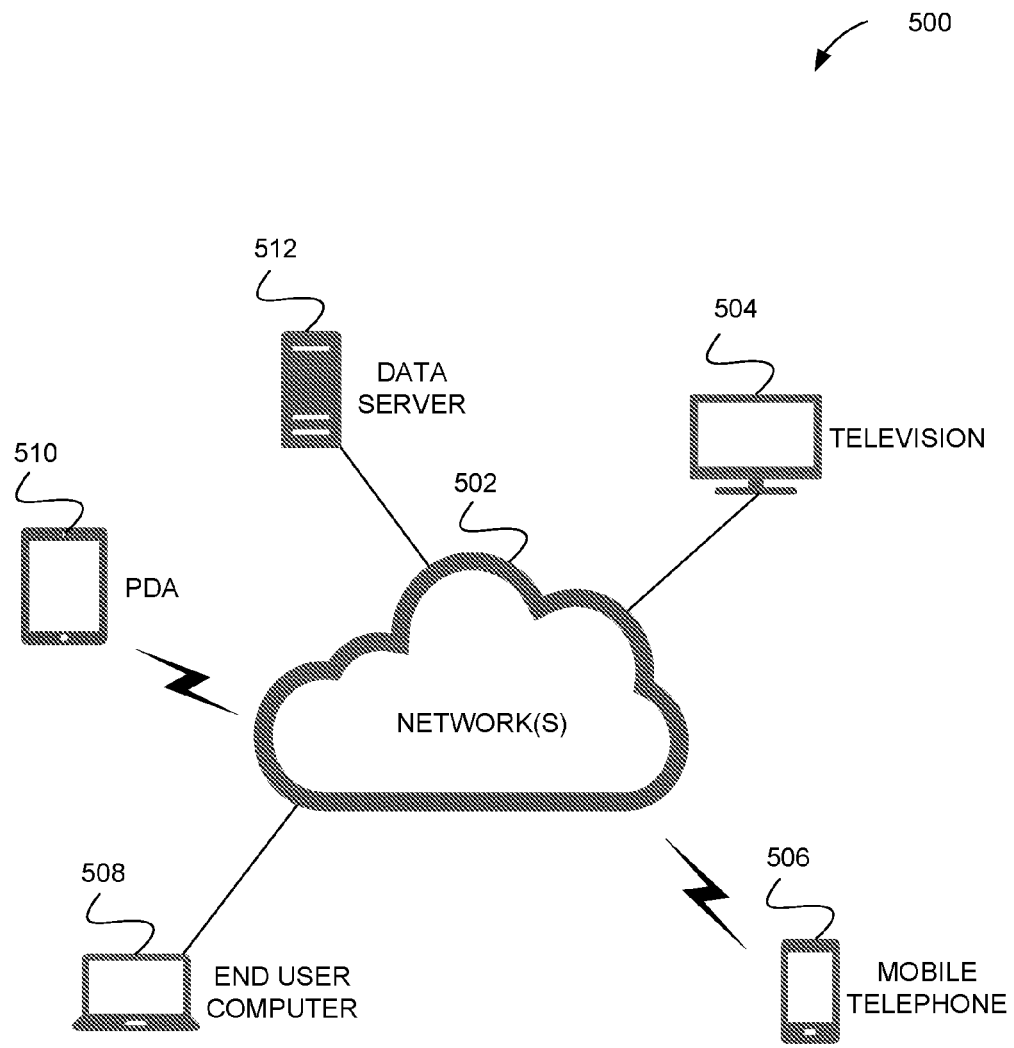
FIG. 5 illustrates a network architecture, in accordance with one embodiment.

FIG. 5 illustrates a network architecture 500, in accordance with one embodiment. As shown, at least one network 502 is provided. In various embodiments, any one or more components/features set forth during the description of any previous figure(s) may be implemented in connection with any one or more of the components of the at least one network 502.

In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 512 and an end user computer 508 may be coupled to the network 502 for communication purposes. Such end user computer 508 may include a desktop computer, lap-top computer, and/or any other type of logic. Still yet, various other devices may be coupled to the network 502 including a personal digital assistant (PDA) device 510, a mobile phone device 506, a television 504, etc.

Figure 6:
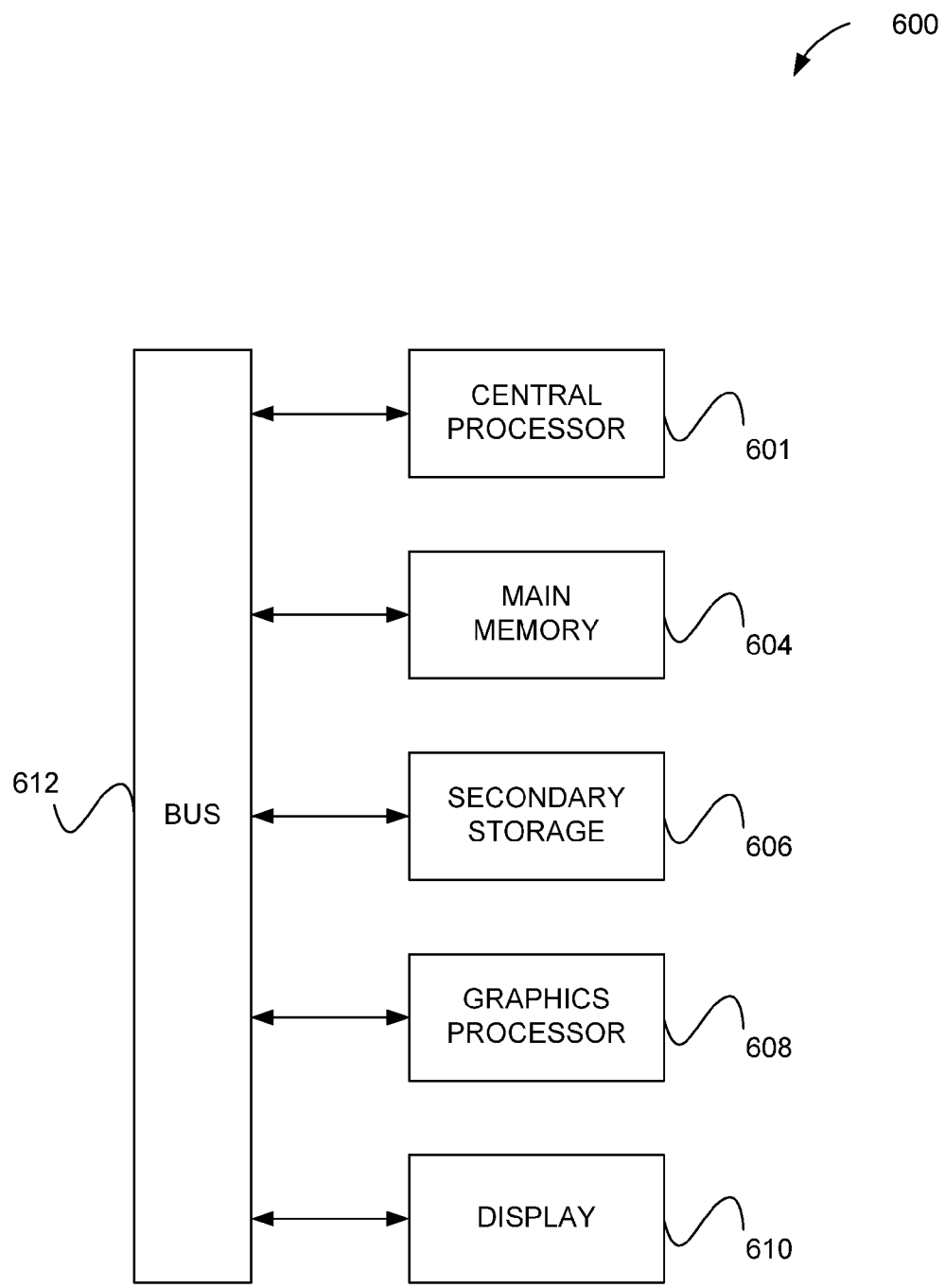
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. However, it is to be appreciated that the system 600 may be implemented in any desired environment.

As shown, a system 600 is provided including at least one central processor 602 which is connected to a bus 612. The system 600 also includes main memory 604 [e.g., hard disk drive, solid state drive, random access memory (RAM), etc.]. The system 600 also includes a graphics processor 608 and a display 610.

The system 600 may also include a secondary storage 606. The secondary storage 606 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 606, and/or any other memory, for that matter. Such computer programs, when executed, enable the system 600 to perform various functions (as set forth above, for example). Memory 604, secondary storage 606 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An apparatus, comprising:
   a linear equalizer that includes:
   a delay circuit including a plurality of delay components,
   a controller in electrical communication with the delay circuit,
   a network of multipliers in electrical communication with the delay circuit, wherein each multiplier in the network of multipliers is associated with a coefficient, and
   an adder in electrical communication with the network of multipliers, wherein the adder is configured to generate an output signal,
   wherein the controller is configured, during calibration of the linear equalizer, to adjust a length of delay exhibited by a first delay component of the plurality of delay components such that a magnitude of a first post-cursor intersymbol interference component in the output signal is suppressed below a threshold value; and
   a decision feedback equalizer in electrical communication with the linear equalizer, the decision feedback equalizer configured to:
   receive the output signal from the linear equalizer, and
   suppress a number of post-cursor intersymbol interference components of the output signal, wherein the number of post-cursor intersymbol interference components does not include the first post-cursor intersymbol interference component.

2. The apparatus of claim 1, wherein the linear equalizer and decision feedback equalizer are included in a receiver path of a serializer/deserializer.

3. The apparatus of claim 1, wherein the linear equalizer includes a feed forward equalizer.

4. The apparatus of claim 1, wherein the decision feedback equalizer includes at least one comparator and at least one latch in electrical communication with a decoder.

5. The apparatus of claim 4, wherein the decision feedback equalizer further includes a tapped delay line in electrical communication with an adder, and wherein an output of the decoder is fed back to the adder via the tapped delay line.

6. The apparatus of claim 1, wherein the threshold value is 10% of a signal pulse magnitude.

7. The apparatus of claim 1, wherein at least a portion of the decision feedback equalizer is configured for operating at a rate that is a fraction of an operational speed of the apparatus such that one or more downstream components has sufficient time to operate.

8. The apparatus of claim 1, wherein the decision feedback equalizer includes a plurality of decision feedback equalizer components that operate using different clocks.

9. The apparatus of claim 1, wherein the controller is configured, during calibration of the linear equalizer, to adjust a length of delay exhibited by a second delay component of the plurality of delay components such that a magnitude of a first pre-cursor intersymbol interference component in the output signal is suppressed below a threshold value.

10. The apparatus of claim 1, wherein a magnitude of the first post-cursor intersymbol interference component in the output signal is suppressed to zero.

11. The apparatus of claim 1, wherein the decision feedback equalizer includes a pair of decision feedback equalizer (DFE) components including an even DFE component and an odd DFE component.

12. The apparatus of claim 11, wherein each DFE component in the pair of DFE components includes a plurality of comparators in electrical communication with a decoder and an amplifier array in electrical communication with a flip-flop array, wherein each amplifier in the amplifier array receives a signal from a different tap point of the flip-flop array, each tap point corresponding to a particular post-cursor intersymbol interference component in the number of post-cursor intersymbol interference components.

13. A method, comprising:
   receiving, at an input of a linear equalizer, a signal pulse, wherein the linear equalizer includes:
   a delay circuit including a plurality of delay components,
   a controller in electrical communication with the delay circuit and configured to adjust a length of delay exhibited by each delay component in the plurality of delay components, a network of multipliers in electrical communication with the delay circuit, wherein each multiplier in the network of multipliers is associated with a coefficient, and an adder in electrical communication with the network of multipliers, wherein the adder is configured to generate an output signal, wherein the controller is configured, during calibration of the linear equalizer, to adjust a length of delay exhibited by a first delay component of the plurality of delay components such that a magnitude of a first post-cursor intersymbol interference component in the output signal is suppressed below a threshold value;

receiving the output signal at a decision feedback equalizer in electrical communication with the linear equalizer; and suppressing a number of the post-cursor intersymbol interference components of the output signal, utilizing the decision feedback equalizer, wherein the number of post-cursor intersymbol interference components does not include the first post-cursor intersymbol interference component.

14. The method of claim 13, wherein the linear equalizer includes a feed forward equalizer.

15. The method of claim 13, further comprising latching the output signal received by the decision feedback equalizer to generate a latched signal.

16. The method of claim 15, further comprising decoding the latched signal.

17. The method of claim 13, wherein the threshold value is 10% of a signal pulse magnitude.

18. The method of claim 13, wherein the controller is configured, during calibration of the linear equalizer, to adjust a length of delay exhibited by a second delay component of the plurality of delay components such that a magnitude of a first pre-cursor intersymbol interference component in the output signal is suppressed below a threshold value.

19. The method of claim 13, wherein a magnitude of the first post-cursor intersymbol interference component in the output signal is suppressed to zero.

20. The method of claim 13, wherein the decision feedback equalizer includes a pair of decision feedback equalizer (DFE) components including an even DFE component and an odd DFE component.

21. The method of claim 20, wherein each DFE component in the pair of DFE components includes a plurality of comparators in electrical communication with a decoder and an amplifier array in electrical communication with a flip-flop array, wherein each amplifier in the amplifier array receives a signal from a different tap point of the flip-flop array, each tap point corresponding to a particular post-cursor intersymbol interference component in the number of post-cursor intersymbol interference components.

* * * * *